United States Patent
Afzal et al.

(10) Patent No.: US 8,948,018 B2
(45) Date of Patent: Feb. 3, 2015

(54) INTEGRATED ETHERNET OVER COAXIAL CABLE, STB, AND PHYSICAL LAYER TEST AND MONITORING

(75) Inventors: Muhammad A. Afzal, Wexford, PA (US); Gregory M. Nulty, Reston, VA (US); Timothy J. Vitanza, Mars, PA (US)

(73) Assignee: Tollgrade Communications, Inc., Cranberry Twp., PA (US)

( * ) Notice: Subject to any disclaimer, the term of this patent is extended or adjusted under 35 U.S.C. 154(b) by 525 days.

(21) Appl. No.: 13/279,627

(22) Filed: Oct. 24, 2011

(65) Prior Publication Data

US 2012/0099436 A1    Apr. 26, 2012

Related U.S. Application Data

(60) Provisional application No. 61/405,820, filed on Oct. 22, 2010.

(51) Int. Cl.
   *G06F 11/00*    (2006.01)
   *H04B 10/071*   (2013.01)
(52) U.S. Cl.
   CPC .................................. *H04B 10/071* (2013.01)
   USPC ......................................... 370/241; 379/1.04
(58) Field of Classification Search
   CPC ............ H04J 43/50; H04J 3/14; H04L 43/00;
       H04L 45/26; H04L 1/243; H04L 43/50;
       H04Q 11/045; H04N 21/4516; H04N 5/44;
       H04N 5/14; H04N 21/8166; G01R 31/11;
       G01R 27/00; G01R 35/00; G01R 27/02;
       G01R 27/08

USPC .......... 370/247, 248, 249, 251; 725/110, 147,
         725/151; 324/533, 534, 600, 606, 607, 691
See application file for complete search history.

(56) References Cited

U.S. PATENT DOCUMENTS 5,699,402 A     12/1997   Bauer et al.
5,946,374 A *    8/1999   Bower ....................... 379/29.01
(Continued)

FOREIGN PATENT DOCUMENTS

EP         1 699 172 A1     9/2006
EP         1 761 012 A1     3/2007
(Continued)

OTHER PUBLICATIONS

International Search Report and Written Opinion for Application No. PCT/US2012/041946 mailed Jan. 24, 2013.
(Continued)

*Primary Examiner* — Brian O'Connor
(74) *Attorney, Agent, or Firm* — Wolf, Greenfield & Sacks, P.C.

(57) ABSTRACT

In a method of testing a residential broadband communication network, a residential gateway or set top box (STB) performs one or more single-ended parametric tests of the residential network that runs therebetween. The residential gateway or STB also performs one or more single-ended reflectometry tests of the residential network that runs therebetween. The residential gateway and the STB perform one or more dual-ended tests of the residential network that runs therebetween. The residential gateway dispatches the results of the foregoing tests to either: a device on the residential network, a device of another network that supplies broadband services to the residential network, or an intelligent device coupled to the residential gateway.

25 Claims, 12 Drawing Sheets

(56) References Cited

U.S. PATENT DOCUMENTS

| | | | |
|---|---|---|---|
| 6,369,650 B1 | 4/2002 | Hayat-Dawoodi | |
| 6,584,148 B1 * | 6/2003 | Zitting et al. | 375/222 |
| 6,654,914 B1 | 11/2003 | Kaffine et al. | |
| 6,690,769 B2 * | 2/2004 | Haines | 379/22.06 |
| 6,751,661 B1 | 6/2004 | Geddes | |
| 6,801,601 B2 * | 10/2004 | Kamali et al. | 379/1.04 |
| 6,823,479 B1 | 11/2004 | McElhaney, Jr. et al. | |
| 6,970,429 B2 | 11/2005 | Arsikere et al. | |
| 7,042,983 B2 | 5/2006 | Bauer et al. | |
| 7,127,506 B1 | 10/2006 | Schmidt et al. | |
| 7,295,655 B2 | 11/2007 | Harrison | |
| 7,521,943 B2 * | 4/2009 | Binder et al. | 324/691 |
| 7,529,347 B2 * | 5/2009 | Warner et al. | 379/1.03 |
| 7,532,011 B2 * | 5/2009 | Shi | 324/533 |
| 7,623,630 B2 * | 11/2009 | Ferdosi et al. | 379/27.01 |
| 7,702,080 B2 * | 4/2010 | Defoort | 379/29.08 |
| 7,924,736 B2 * | 4/2011 | Cioffi et al. | 370/252 |
| 7,933,295 B2 * | 4/2011 | Thi et al. | 370/493 |
| 8,031,841 B2 | 10/2011 | Barzegar et al. | |
| 8,232,807 B2 * | 7/2012 | Durston et al. | 324/533 |
| 8,259,907 B2 * | 9/2012 | Irenze et al. | 379/21 |
| 8,279,805 B2 * | 10/2012 | Taylor et al. | 370/328 |
| 2002/0061012 A1 | 5/2002 | Thi et al. | |
| 2002/0150217 A1 | 10/2002 | Haines | |
| 2002/0172329 A1 * | 11/2002 | Rashid-Farrokhi et al. | 379/22.02 |
| 2004/0080323 A1 | 4/2004 | Bostoen et al. | |
| 2005/0232159 A1 | 10/2005 | Joo et al. | |
| 2006/0164101 A1 | 7/2006 | Fossion et al. | |
| 2006/0193444 A1 | 8/2006 | Aufenast et al. | |
| 2006/0198500 A1 | 9/2006 | Defoort | |
| 2007/0001685 A1 | 1/2007 | Gorka | |
| 2007/0147591 A1 | 6/2007 | Ploumen et al. | |
| 2007/0192477 A1 | 8/2007 | Hicks et al. | |
| 2007/0230667 A1 | 10/2007 | Warner et al. | |
| 2008/0013612 A1 | 1/2008 | Miller et al. | |
| 2008/0205501 A1 | 8/2008 | Cioffi et al. | |
| 2009/0047016 A1 | 2/2009 | Bernard et al. | |
| 2009/0080349 A1 | 3/2009 | Rofougaran | |
| 2009/0135732 A1 | 5/2009 | Maxson | |
| 2010/0150319 A1 | 6/2010 | Irenze et al. | |
| 2012/0099629 A1 | 4/2012 | Faulkner et al. | |
| 2012/0140641 A1 | 6/2012 | Reese et al. | |
| 2012/0306895 A1 | 12/2012 | Faulkner et al. | |
| 2012/0307982 A1 | 12/2012 | Faulkner et al. | |
| 2012/0307983 A1 | 12/2012 | Faulkner et al. | |

FOREIGN PATENT DOCUMENTS

| | | |
|---|---|---|
| EP | 1 796 282 A1 | 6/2007 |
| EP | 2 216 972 A1 | 8/2010 |
| WO | WO 2005/036919 A2 | 4/2005 |
| WO | WO 2007/008835 A2 | 1/2007 |
| WO | WO 2010/091340 A2 | 8/2010 |
| WO | WO 2012/054921 A2 | 4/2012 |

OTHER PUBLICATIONS

International Search Report and Written Opinion for Application No. PCT/US2012/041952 mailed Jan. 24, 2013.
Invitation to Pay Additional Fees for Application No. PCT/US2012/041956 mailed Jan. 24, 2013.
International Search Report and Written Opinion for Application No. PCT/US2012/041956 mailed Apr. 5, 2013.
International Search Report and Written Opinion for Application No. PCT/US2011/057475 mailed May 4, 2012.
International Preliminary Report on Patentability for Application No. PCT/US2011/057475 mailed May 2, 2013.
Invitation to Pay Additional Fees for Application No. PCT/US2011/057486 mailed Nov. 28, 2011.
International Search Report and Written Opinion for Application No. PCT/US2011/057486 mailed Apr. 19, 2012.
International Preliminary Report on Patentability for Application No. PCT/US2011/057486 mailed May 2, 2013.
"3M Dynatel Line Tester 946-PT," 2006, 4 pages, 3M Telecommunications, Austin, TX.
"JDSU SmartClass IW-1000," SmartClass IW-1000 datasheet, 2011, 8 pages, JDS Uniphase Corporation, US.
International Preliminary Report on Patentability for Application No. PCT/US2012/041946 mailed May 8, 2014.
International Preliminary Report on Patentability for Application No. PCT/US2012/041952 mailed May 8, 2014.
International Preliminary Report on Patentability for Application No. PCT/US2012/041956 mailed May 8, 2014.

* cited by examiner

TO/FROM FIG. 11B

| TEST TYPE | PARAMETER 1 | PARAMETER 2 | PARAMETER 3 |
|---|---|---|---|
| FDR (REFLECTOMETRY) | Lo FREQ=100Hz | Hi FREQ=500 kHz OR 2MHz | STEP FREQ= 100Hz |
| TDR (REFLECTOMETRY) | PULSE SHAPE= RECTANGULAR OR GAUSSIAN | PULSE WIDTH=2us OR 500ns | AMPLITUDE= 5V |
| DCV (PARAMETRIC) | SENSE RESISTANCE=100kOhm OR 1MOhm | | |
| ACV (PARAMETRIC) | SENSE RESISTANCE=100kOhm OR 1MOhm | | |
| 3-TERM RESISTANCE (PARAMETRIC) | SOURCE VOLTAGE (MIN) = -5V | SOURCE VOLTAGE (MAX) = 5V | |
| 3-TERM IMPEDANCE (PARAMETRIC) | SOURCE VOLTAGE (MIN) = -5Vpk | SOURCE VOLTAGE (MAX) = 5Vpk | |
| 3-TERM IMPED OVER FREQ (PARAMETRIC) | SOURCE VOLTAGE (MIN) = -5Vpk | SOURCE VOLTAGE (MAX) = 5Vpk | SOURCE RESISTANCE=100 Ohm, 10kOhm, OR 1 MOhm |
| XMIT TONE FOR 2-END TEST (DUAL-ENDED) | Lo FREQ=100Hz | Hi FREQ=500 kHz OR 2MHz | RESOLUTION=100 Hz |
| RCV TONE FOR 2-END TEST (DUAL-ENDED) | Lo FREQ=100Hz | Hi FREQ=500 kHz OR 2MHz | RESOLUTION=100 Hz |

FIG. 11A

| PARAMETER 4 | PARAMETER 5 | PARAMETER 6 |
|---|---|---|
| AMPLITUDE = 2 OR 5Vpk | | |
| | | |
| | | |
| SOURCE RESISTANCE= 100 Ohm, 10 kOhm, OR 1 MOhm | | |
| SOURCE RESISTANCE= 100 Ohm, 10 kOhm, OR 1 MOhm | | |
| Lo FREQ=0 Hz | Hi FREQ=200 kHz OR 1MHz | STEP FREQ= 100Hz OR 1kHz |
| TRANSMIT LEVEL=MINUS 20 TO PLUS 5 dBm | | |
| RECEIVE LEVEL=MINUS 50 dBm TO PLUS 5 dBm | | |

TO/FROM FIG. 11A

FIG.11B

INTEGRATED ETHERNET OVER COAXIAL CABLE, STB, AND PHYSICAL LAYER TEST AND MONITORING

CROSS REFERENCE TO RELATED APPLICATION

This application claims priority from U.S. Provisional Patent Application No. 61/405,820, filed Oct. 22, 2010, which is incorporated herein by reference.

BACKGROUND OF THE INVENTION

1. Field of the Invention

The present invention relates to testing in-home coaxial cable, Ethernet communications over coaxial cable, high speed data over twisted pair, video over internet protocol (IPTV) packet level monitoring, and set top box (STB) monitoring. More particularly, the invention relates to hardware and firmware additions to MoCA, HPNA, and G.hn chipsets, and a software (SW) application which is added to existing equipment that provides aggregation of data obtained from the existing customer premise equipment (CPE) such as the residential gateway (comprising a modem or modem function and a router or router function), and STB and adds metallic cable testing. The unique combination of data sources allows faster and more accurate analysis of service impairments than can be achieved by each separate source of data.

2. Description of Related Art

In-home (residential) local area networks (LAN) have been increasing the data bandwidth to speeds such that impairments either on or in combination with the physical, equipment, or service layers can render the home network unreliable for applications such as IPTV or VoIP. Test and diagnostics data is available from each of these layers that help identify impairments. However, this data provides a singular view of the impairments that occur within the LAN, and in many cases additional data is needed before identification, location, and resolution of impairments can be determined.

SUMMARY OF THE INVENTION

The present invention aggregates data from multiple sources and determines the fault identification, location, and resolution, desirably by way of an artificial intelligence algorithm.

More specifically, the invention is a method of testing a first, residential broadband communication network (2) comprised of a first node (8) and a second node (14), wherein the first node includes circuitry (36) for application of AC and DC test signals in a direction on the first network toward the second node and a measurement circuit for detecting for the presence of AC and DC signals on the first network, and the second node includes circuitry (36) for application of AC and DC test signals in a direction on the first network toward the first node and a measurement circuit for detecting for the presence of AC and DC signals on the first network. The method comprises: (a) the first node or the second node performing one or more single-ended parametric tests of the first network that runs between the first node and the second node; (b) the first node or the second node performing one or more single-ended reflectometry tests of the first network that runs between the first node and the second node; (c) the first node and the second node performing one or more dual-ended tests of the first network that runs between the first node and the second node; and (d) the first node dispatching the results of the tests in steps (a)-(c) to either: a device on the first network (18), a device (4) of a second network that supplies broadband services to the first network, or an intelligent device coupled to the first node. The first node can be a residential gateway. The second node can be a set top box (STB), a PC, or a smart device that includes a MoCA, HPNA, G.hn, or similar interface.

In step (d), the results of the tests in steps (a)-(c) can include the first node integrating data obtained or determined in response to the tests of steps (a)-(c) and analyzing the integrated data to determine one of the following: that the communication network can support a particular speed broadband service or a root cause of a failure in the communication network.

The residential gateway is operative for performing the function of a modem and a router, wherein the modem function receives broadband services from the second network, and the router functions supplies broadband services to the first network.

The first node can convert between DSL or cable service on the second network and Ethernet service on the first network, and vice versa.

The first network can include coaxial cable, a wire pair, or a twisted pair. The second network can include a wire pair, a twisted pair, a coaxial cable or a fiber optic line.

The one or more single-ended reflectometry tests can include: a single-ended time-domain reflectometry test; a single-ended frequency-domain reflectometry test; or both. The one or more single-ended reflectometry tests determine one or more of the following for a cable of the first network: an open; a short; termination status; length; integrity of connectors and/or splices; and insertion loss.

The one or more single-ended parametric tests include: an AC metallic line test; a DC metallic line test; or both The one or more single-ended parametric tests determine one or more of the following: Noise on the first network; Longitudinal Balance of cabling of the first network; Insertion Loss of the cabling the first network; Insulation resistance of the cabling of the first network; Line impedance/reactance of the cabling of the first network; the presence of a foreign AC voltage on the cabling of the first network; the presence of a foreign DC voltage on the cabling of the first network; an estimate of a length of the cabling of the first network; and a termination status of the cabling of the first network.

The invention is also a broadband communication network comprising: a residential gateway operative as an broadband interface between a broadband service provider and a broadband residential communication network, said residential gateway including first test hardware and a first CPU that operates under the control of a first software agent for controlling the operation of the first test hardware to apply an AC test signal, a DC test signal, or both to the residential communication network and to sample an AC signal, a DC signal, or both on the residential communication network; and at least one interface device (ID) operative as an interface between the broadband residential communication network and a data service receiving device, each ID including second test hardware and a second CPU that operates under the control of a second software agent for controlling the operation of the second test hardware to apply an AC test signal, a DC test signal, or both to the residential communication network and to sample an AC signal, a DC signal, or both on the residential communication network.

The first test hardware can be operative for sampling a response of the residential communication network to a test signal applied by the first test hardware or the second test hardware, or the second test hardware can be operative for sampling a response of the residential communication network to a test signal applied by the first test hardware or the second test hardware.

The first test hardware, the second test hardware, or both can be operative for performing one or more of the following: one or more single-ended parametric tests of the residential communication network; and one or more single-ended reflectometry tests of the residential communication network. The first test hardware and the second test hardware can be operative for performing one or more dual-ended tests of the residential communication network.

The broadband communication network can include a plurality of IDs, wherein the second test hardware of one of the plurality of IDs is operative for performing one or more of the following: one or more single-ended parametric tests of the residential communication network; and one or more single-ended reflectometry tests of the residential communication network.

The broadband communication network can include a plurality of IDs, wherein the second test hardware of one of the plurality of IDs and the second test hardware of another one of the plurality of IDs are operative for performing one or more dual-ended tests of the residential communication network.

A junction can connect the residential gateway to each ID.

The first or second CPU can be operative for integrating data either (1) obtained from the communication network or (2) determined in response to one or more single-ended tests, one or more dual-ended tests, or both of the communication network and for analyzing the integrated data to determine one of the following: that the communication network can support a broadband services of a particular speed or a root cause of a failure in the communication network.

Coaxial cable or a wire pair or a twisted wire pair can connect the residential gateway and the ID.

The residential gateway can comprise a modem function coupled to the broadband service provider and a router function coupled to the communication network.

Lastly, the invention is a method of testing a residential broadband communication network comprising: (a) outputting from a first node of a residential broadband communication network that receives broadband services from a broadband service provider a DC single-ended test signal, an AC single-ended test signal, or both onto said broadband communication network; and (b) determining at the first node in response to the test signal(s) output in step (a), an electrical condition of the broadband communication network.

The method can further include: (c) causing the first node and a second node of the broadband communication network to co-act to perform dual ended testing of the broadband communication network.

Step (b) can include determining one of the following conditions of cabling of the broadband communication network: longitudinal balance; insertion loss; insulation resistance; line impedance/reactance; the presence of a foreign AC voltage; the presence of a foreign DC voltage; length; termination status; an open; a short; and an integrity of connectors and/or splices of the cabling.

Step (c) can include determining one of the following conditions of cabling of the broadband communication network: insertion loss; length; noise and interference; and cabling connectivity and integrity.

Step (b) can further include the first node integrating single-ended test data, dual-ended test data, or both and analyzing the integrated data to determine one of the following: that the communication network can support a particular speed broadband service or a root cause of a failure in the communication network.

BRIEF DESCRIPTION OF THE DRAWINGS

FIGS. 11A and 11B are exemplary test parameters for various tests that can be performed by the residential gateway and/or one or more of the STBs of FIG. 1.

DETAILED DESCRIPTION OF THE INVENTION

Figure 1:
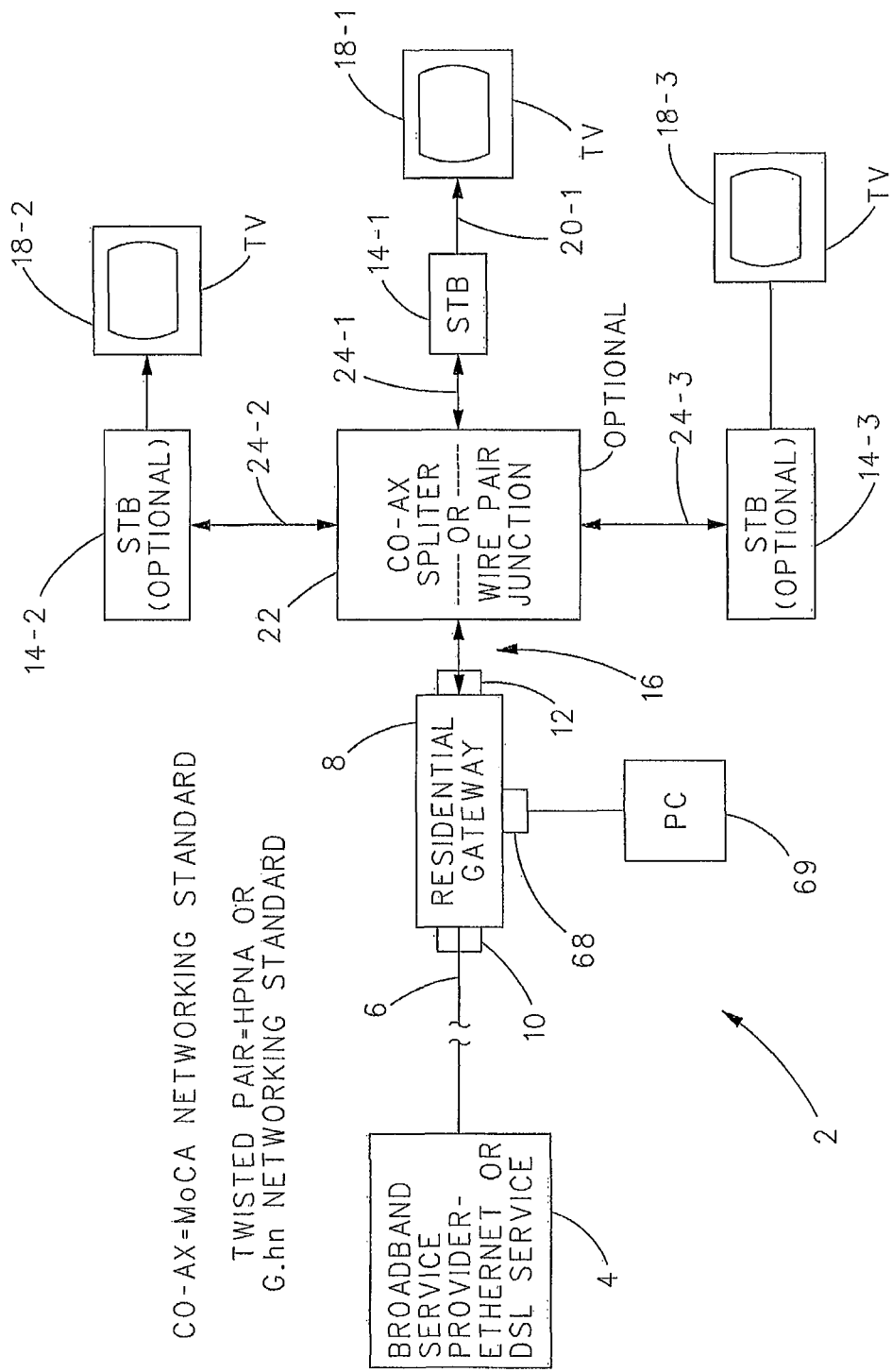
FIG. 1 is a block diagram of an in-home or residential communication network receiving broadband services from a broadband service provider.

The present invention will now be described with reference to the accompanying figures.

An in-home or residential communication network 2 receives broadband service from a broadband service provider 4 via a communication line 6. Communication line 6 can be a wire pair, a twisted pair, a coaxial cable, or even a fiber optic line for providing, without limitation, DSL service to communication network 2. The particular type of data service provided by broadband service provider 4 to communication network 2 via communication line 6, however, is not to be construed as limiting the invention.

Communication network 2 includes a residential gateway 8 which includes a wide area network (WAN) port 10 for receiving broadband services from broadband service provider 4 via communication line 6 and a local area network (LAN) port 12 for providing high speed data service (e.g., Ethernet service) to other nodes of communication network 2. As is known in the art, residential gateway 8 comprises an internal modem (or modem function) for receiving broadband services via WAN port 10 of residential gateway and an internal router (or router function) which provides broadband services to LAN port 12. However, it is envisioned that the output of the modem function of residential gateway 8 can be coupled directly to LAN port 12.

In a minimal embodiment, LAN port 12 is coupled directly to a single node of communication network 2, in this example an input of a set-top box (STB) 14-1, via a cable 16 that extends directly between LAN port 12 and the input of STB 14-1. Cable 16 can be either a coaxial cable or a wire pair, such as a twisted pair or a tip-ring pair. In a manner known in the art, STB 14-1 coverts incoming signals provided by LAN port 12 and cable 16 into audio and/or video content that is supplied to a device, such as, without limitation, a television 18-1 via a cable 20-1. Cable 20-1 can be a Cat-5, a Cat-6 cable, or a coaxial cable depending upon the output and input connections of STB 14-1 and television 18-1, respectively.

In an alternate embodiment, communication network 2 includes a plurality of STBs 14 (2, or 3, or more) with the output of each STB connected to supply audio and/or video service(s) to a device, such as a television 18. The embodiment shown in FIG. 1 includes three STBs (or nodes), namely, 14-1, 14-2, and 14-3, all connected to LAN port 12 of residential gateway 8 via a junction 22. To facilitate connections of LAN port 12 to each STB 14-1-14-3, instead of cable 16 being connected to the input of STB 14-1, cable 16 is connected to an input of junction 22. Where cable 16 is a coaxial cable, junction 22 is a coaxial cable splitter that physically couples coaxial cable 16 to cables 24-1, 24-2, and 24-3 which service STBs 14-1, 14-2, and 14-3, respectively. Where junction 22 is a coaxial cable splitter, cables 24-1-24-3 are also coaxial cables. However, where cable 16 is a wire pair, such as a twisted pair or a tip-ring pair, each cable 24-1-24-3 is a wire pair and junction 22 is a wire pair junction that connects the pair of wires of cable 16 to each wire pair of cables 24-1-24-3. For example, where cable 16 is a tip-ring pair, junction 22, in its capacity as a wire pair junction, connects the tip wire of cable 16 to the tip wire of each cable 24-1-24-3 and connects the ring wire of cable 16 to the ring wire of each cable 24-1-24-2. It is envisioned that where junction 22 is a coaxial cable splitter, junction 22 can optionally include switches known in the art. However, this is not to be construed as limiting the invention.

In the foregoing description, WAN port 10 and LAN port 12 were configured to facilitate DSL service and Ethernet service, respectively. This type of conversion by residential gateway 8 can be useful where pre-installed cables 16, 24-1, 24-2, and/or 24-3 are coaxial cables or wire pairs, such as twisted pairs or tip-ring pairs, and cable 6 is coaxial cable or a fiber optic line.

In review, LAN port 12 can be connected directly to STB 14-1 via cable 16. Alternatively, LAN port 12 can be connected to two or more STBs 14 via junction 22 in the form of a coaxial cable splitter or a wire pair junction.

Figure 2:
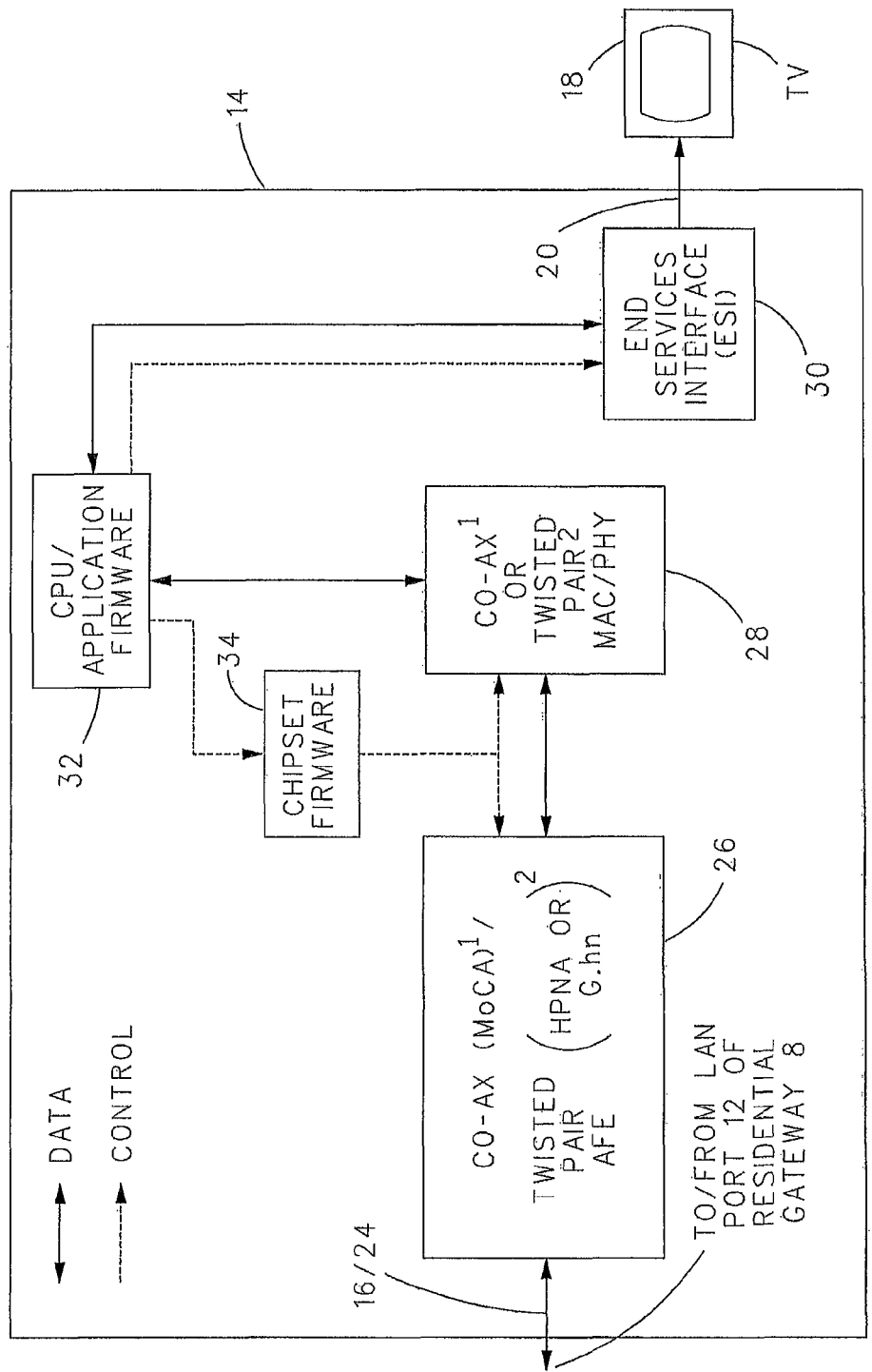
FIG. 2 is a block diagram of the internal components of a prior art set top box (STB) that can be utilized with the in-home or residential communication network shown in FIG. 1.

With reference to FIG. 2 and with continuing reference to FIG. 1, each STB 14 shown in FIG. 1 includes an analog front end (AFE) chip 26, a MAC/physical layer (MAC/PHY) chip 28, an end services interface (ESI) block 30 and a CPU 32, all connected in the manner illustrated in FIG. 2. AFE chip 26 has an input connected to LAN port 12 of residential gateway 8 either directly via cable 16 or via a cable 24 (e.g., cable 24-1) and junction 22. The output of AFE chip 26 is coupled to an input of MAC/PHY chip 28 which has an output connected to CPU 32. CPU 32 is connected to an input of ESI 30 which can be any suitable and/or desirable interface, such as, without limitation, HDMI, component video/audio, or composite video/audio. The output of ESI 30 is connected via a cable 20 (e.g., cable 20-1) to a television 18 (e.g., television 18-1). It is envisioned that AFE chip 26 and MAC/PHY chip 28 can support MoCA, HPNA, and/or G.hn services.

AFE chip 26 and MAC/PHY chip 28 operate under the control of a chipset firmware 34 operating under the control of CPU 32 that in turn operates under the control of an application firmware. CPU 32 operating under the control of the application firmware acts as a data interface between MAC/PHY chip 28 and ESI block 30. CPU 32 operating under the control of the application firmware also provides control signals to ESI block 30 to control the operation thereof to (in this example) provide audio and/or visual services to television 18 via cable 20. The firmware of chipset firmware 34 is selected to correspond to the type of service provided by AFE chip 26 and MAC/PHY 28, namely, MoCA, HPNA, and/or G.hn.

AFE chip 26, MAC/PHY chip 28, CPU 32 and its application firmware, and ESI block 30 of STB 14 are configured to the broadband service provided by LAN port 12 of residential gateway 8. For example, if LAN port 12 provides Ethernet service, AFE chip 26, MAC/PHY chip 28, CPU 32 and its application firmware, and ESI block 30 are configured to process Ethernet packets into audio and/or visual signals provided to television 18 via cable 20. For example, AFE chip 26 and MAC/PHY chip 28 can each be configured to operate in accordance with the MoCA, HPNA and/or G.hn networking standard. The MoCA, HPNA, and G.hn networking standards are well known in the art and will not be described further herein for the purpose of simplicity.

Having described a conventional in-home or residential communication network 2 (FIG. 1) and a prior art STB 14 (FIG. 2), the present invention will now be described with reference to FIG. 3 and with continuing reference to FIGS. 1 and 2. More specifically, the present invention will be described with reference to an in-home or residential communication network 2 including a residential gateway 8 that services one or more STBs 14-1, 14-2, and/or 14-3. However, this is not to be construed as limiting the invention since any one or more of STBs 14-1-14-3 can be replaced with any suitable and/or desirable node that implements a MoCA, HPNA, and/or G.hn service. For example, any STB 14 in FIG. 1 can be replaced with, for example, a PC or a smart appliance or device that includes a MoCA, HPNA, G.hn or equivalent or similar interface. In addition, any one or more of STBs 14-1-14-3 can be eliminated whereupon the end of the corresponding cable is unterminated or open, as is often the case in a typical residential communication network. Herein, each instance of an STB, PC, smart appliance or device, or the like may be thought of as an interface device (ID) between residential gateway 8 and a data service receiving device, such as, without limitation, a television 18, the CPU of the PC, a controller of an appliance or device, and the like.

Figure 3:
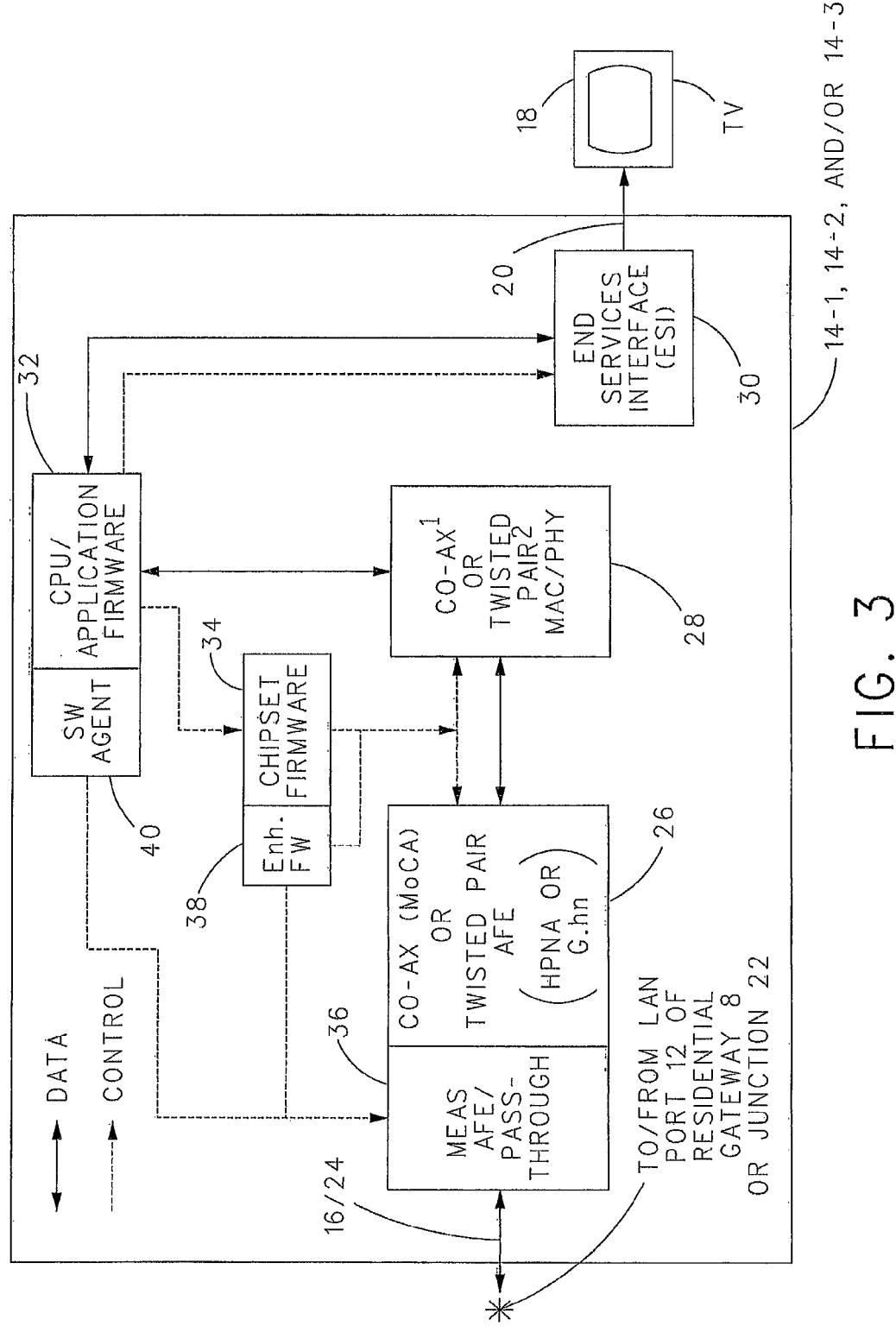
FIG. 3 is a block diagram of a STB in accordance with the present invention that can be utilized for each instance of a STB shown in FIG. 1.

FIG. 3 is an illustration of the hardware, firmware, and software in accordance with the present invention that is added to the prior art STB shown in FIG. 2 to facilitate testing of cabling and connections of communication network 2 in accordance with the present invention. Specifically, a Measurement AFE/Pass-Through 36 is incorporated inline between LAN port 12 and the input of AFE chip 26. In one desirable embodiment, the hardware of Measurement AFE/Pass-Through 36 is incorporated directly into AFE chip 26. However, this is not to be construed as limiting the invention. In addition, to facilitate the function of Measurement AFE/Pass-Through 36, chipset firmware 34 is augmented with enhanced firmware 38 that is either made part of chipset firmware 34 at the factory or is downloaded and made part of chipset firmware 34 via communication network 2. Lastly, a software agent 40 is either pre-installed at the factory or is downloaded via communication network 2 and made part of the application firmware that controls the operation of CPU 32. Enhanced firmware 38 and/or software agent 40 can either be pre-installed at the factory or downloaded into the embodiment of STB 14 shown in FIG. 3 via broadband service provider 4 and residential gateway 8.

Figure 4:
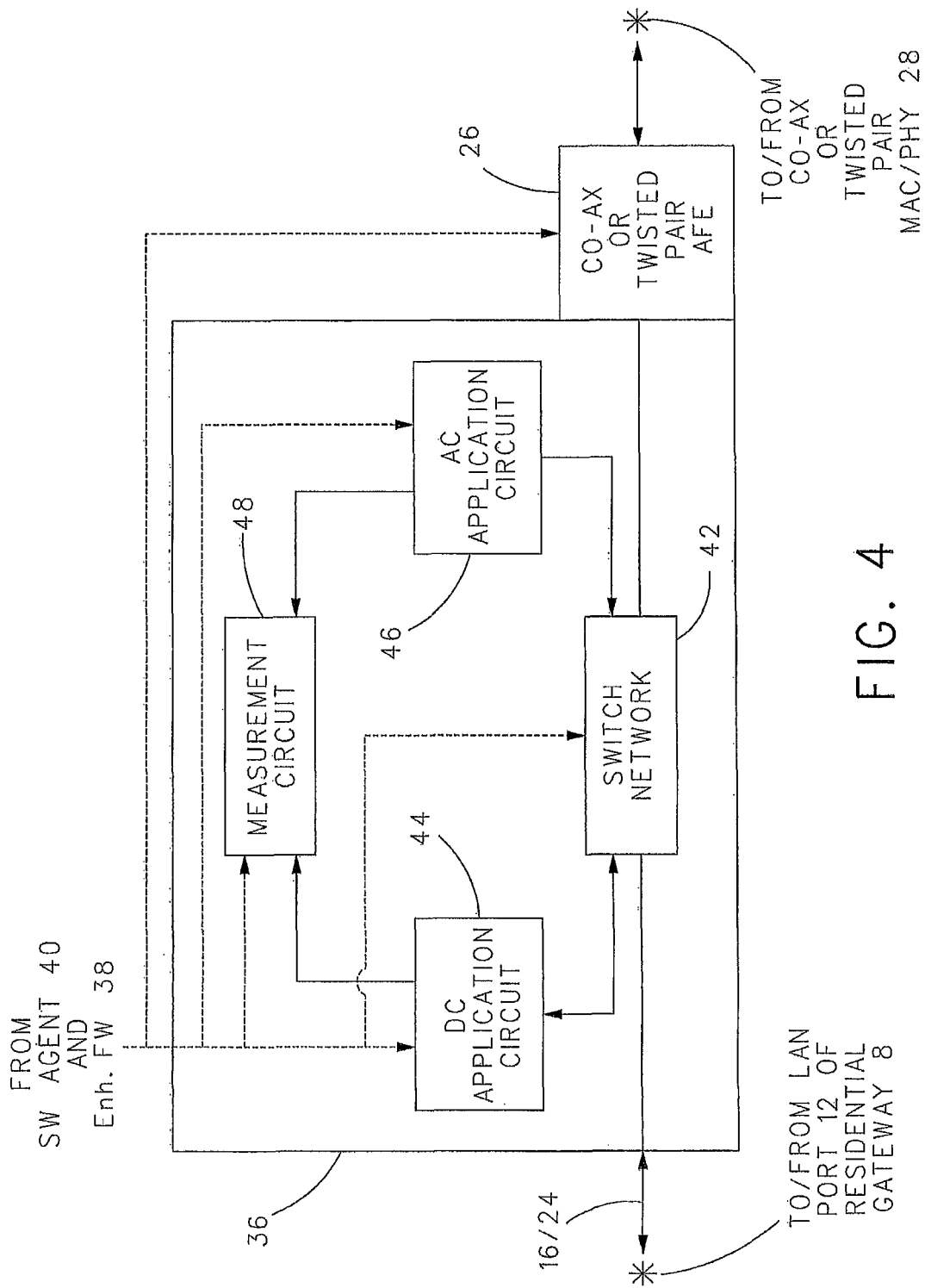
FIG. 4 is a block diagram of the internal components of a Measurement AFE/Pass-Through shown in FIG. 3.

With reference to FIG. 4 and with continuing reference to all previous figures, Measurement AFE/Pass-Through 36 includes a switch network 42, a DC application circuit 44, an AC application circuit 46, and a measurement circuit 48 all connected as shown. In operation, switch network 42 is operative for individually (one-at-a-time) coupling AFE chip 26 in a pass-through mode between LAN port 12 (via cable 16 or 24) and AFE chip 26; for connecting DC application circuit 44 to cable 16 or 24; and/or for connecting AC application circuit 46 to cable 16 or 24.

In the foregoing discussion and FIGS. 2-4, STB 14 and/or Measurement AFE/Pass-Through 36 is described as being connected to either cable 16 or cable 24. It is to be appreciated that connection to cable 16 occurs when STB 14 (e.g., STB 14-1) is connected directly to LAN port 12. In contrast, the connection to cable 24 occurs when one or more STBs 14 connect to LAN port 12 via junction 22.

Figure 5A:
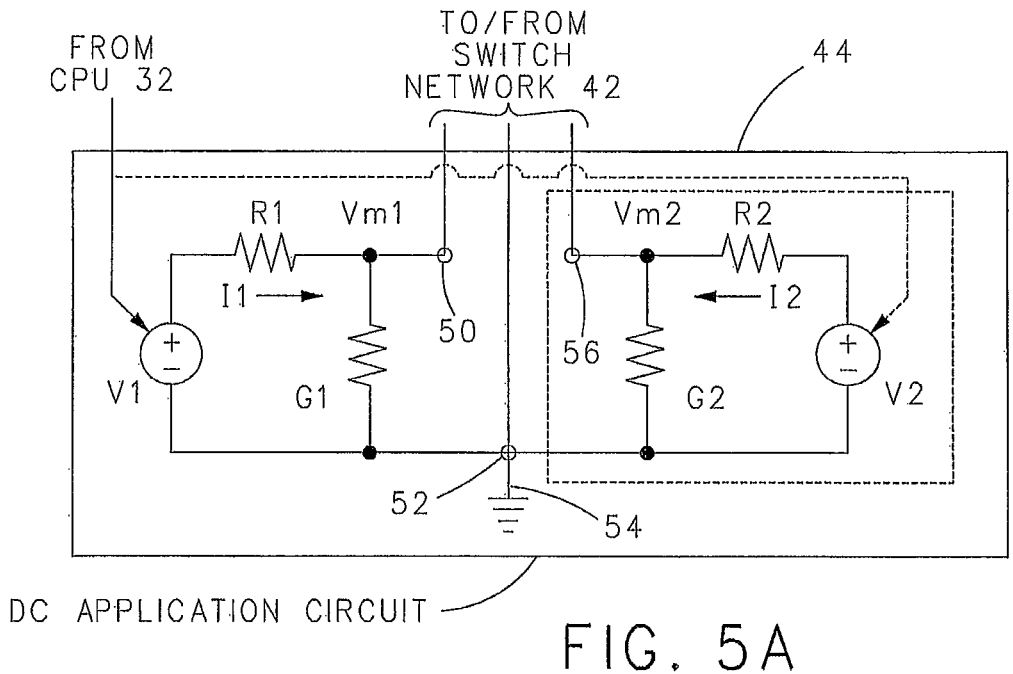
FIG. 5A is a schematic diagram of the of the internal components of the DC application circuit shown in FIG. 4.
Figure 5B:
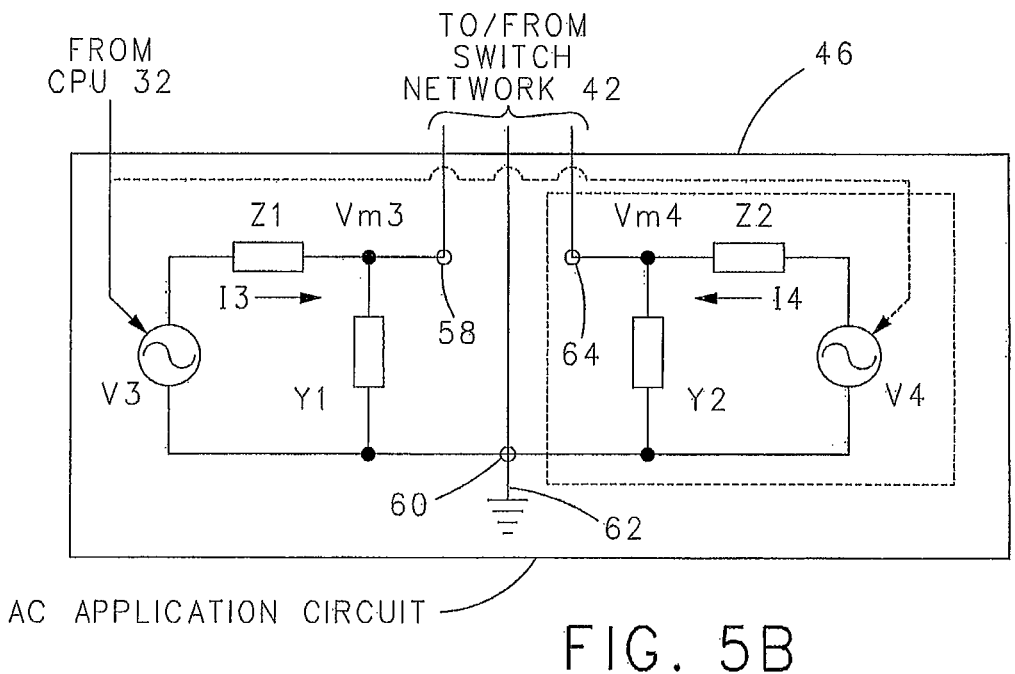
FIG. 5B is a schematic diagram of the of the internal components of the AC application circuit shown in FIG. 4.

With reference to FIGS. 5A and 5B and with continuing reference to FIG. 4, DC application circuit 44 includes a DC voltage source V1, a resistance R1, and a conductance G1 all connected in the manner shown in FIG. 5A. Optionally, DC application circuit 44 can include a second voltage source V2, a second resistance R2, and a second conductance G2 connected in the manner shown in FIG. 5A. DC application circuit 44 defines a node 50 at the junction of resistance R1 and conductance G1 and a node 52 which acts as a reference or ground potential 54. Where DC application circuit 44 includes the optional resistance R2 and conductance G2, DC application circuit 44 also defines a node 56 at the junction of resistance R2 and conductance G2. Each node 50, 52, and, optionally, 56 is couplable via switch network 42 to cable 16 or 24 in any suitable and/or desirable manner that facilitates testing in the manner described hereinafter. Where cable 16 or 24 is a wire pair, such as a twisted pair or a tip-ring pair, switch network 42 connects node 50 to one of said wires and connects either ground node 52 or, optionally, mode 56 to the other of said wires as deemed suitable and/or desirable by the test to be performed. For example, when it is desirable to supply common mode or differential mode signals to the pair of wires of cable 16 or 24, switch network 42 connects nodes 50 and 56 to said wires. Similarly, if it is desired to reference one of the pair of wires of cable 16 or 24 to ground, switch network 42 connects nodes 50 and 52 to said pair of wires. Similarly, where cable 16 or 24 is a coaxial cable, switch network 42 can connect node 50 to the center conductor and can connect either node 52 or, if provided, node 56 to the sheath of said coaxial cable as deemed suitable and/or desirable by the test to be performed. Desirably, voltage source V1 and, if provided, voltage source V2 are programmable source (s) that can be controlled by CPU 32 operating under the control of software agent 40.

Referring now to FIG. 5B, AC application circuit 46 includes an AC voltage source V3, an impedance Z1, and an admittance Y1 connected in the manner shown. Desirably, voltage source V3 is a programmable source that can be programmed to output sinusoidal AC signals or pulse AC signals under the control of CPU 32 operating under the control of the SW agent 40 of measurement AFE/pass-through 36. Optionally, AC application circuit 46 can include a second voltage source V4, a second impedance Z2, and a second admittance Y2 all connected as shown in FIG. 5B. Like voltage source V3, voltage source V4 is desirably a programmable source operating under the control of CPU 32 operating under the control of the SW agent 40 of measurement ATE/pass-through 36 to output sinusoidal or pulse AC signals. The junction of impedance Z1 and admittance Y1 define a node 58. A reference or ground potential 62 defines a node 60 of AC application 46. If provided, the junction of impedance Z2 and admittance Y2 define a node 64.

Under the control of switch network 42, node 58, 60, and, if provided, node 64, can be selectively connected to the wires comprising cable 16 or 24, which can be either a coaxial cable or a wire pair, such as a twisted pair or a tip-ring pair. For example, when it is desirable to supply common mode or differential mode AC signals to the pair of wires of cable 16 or 24, switch network 42 connects nodes 58 and 64 to said pair of wires. Similarly, if it is desired to reference one of the pair of wires of cable 16 or 24 to ground, switch network 42 connects nodes 58 and 60 to said pair of wires in a suitable manner. Similarly, where cable 16 or 24 is a coaxial cable, switch network 42 can connect node 58 to the center conductor and can connect either node 62 or, if provided, node 64 to the sheath of said coaxial cable as deemed suitable and/or desirable by the test to be performed.

Desirably, switch network 42 can selectively connect the pair of wires of cable 16 or 24 to the nodes of DC application circuit 44 or AC application 46, one-at-a-time. Hence, the nodes of DC application circuit 44 can be connected to the wires of cable 16 or 24 independent of the nodes of AC application circuit 46, and vice versa.

Measurement circuit 48 includes suitable internal circuitry, such as, without limitation, an analog-to-digital converter (ADC) that is operative for detecting a condition of the pair of wires of cable 16 or 24 or the response of the pair of wires of cable 16 or 24 to voltages and/or currents impressed on said wires by DC application circuit 44 and/or AC application circuit 46. More specifically, measurement circuit 48 is desirably coupled to nodes 50, 52, and, if provided, 56 and is connected to nodes 58, 60, and, if provided, 64 of AC application circuit 46. It is envisioned that measurement circuit 48 can include any necessary hardware and/or software deemed suitable and/or desirable by one of ordinary skill in the art to accomplish measurement of the condition of the pair of wires of cable 16 or 24 and/or the acquisition of the response of the pair of wires of cable 16 or 24 to the application of one or more DC signals by DC application 44 and/or one or more AC signals by AC application circuit 46. For example, measurement circuit 48 can include one or a number of ADCs and, if necessary, a switch network that enables the selective connection of said one or more ADCs to appropriate nodes of DC application circuit 44 and/or AC application circuit 46. The type and arrangement of the internal elements or circuits of measurement circuit 48 is not to be construed as limiting the invention since it is envisioned that measurement circuit 48 can include any suitable and/or desirable number and arrangement of elements or circuits that enables the measurement of the condition of the pair of wires of cable 16 or 24 existing on the pair of wires of cable 16 or 24 (e.g., resistance or capacitance) and/or the response of the wires of cable 16 or 24 to DC and/or AC signals impressed on said wires by DC application circuit 44 and/or AC application circuit 46, respectively.

Figure 6:
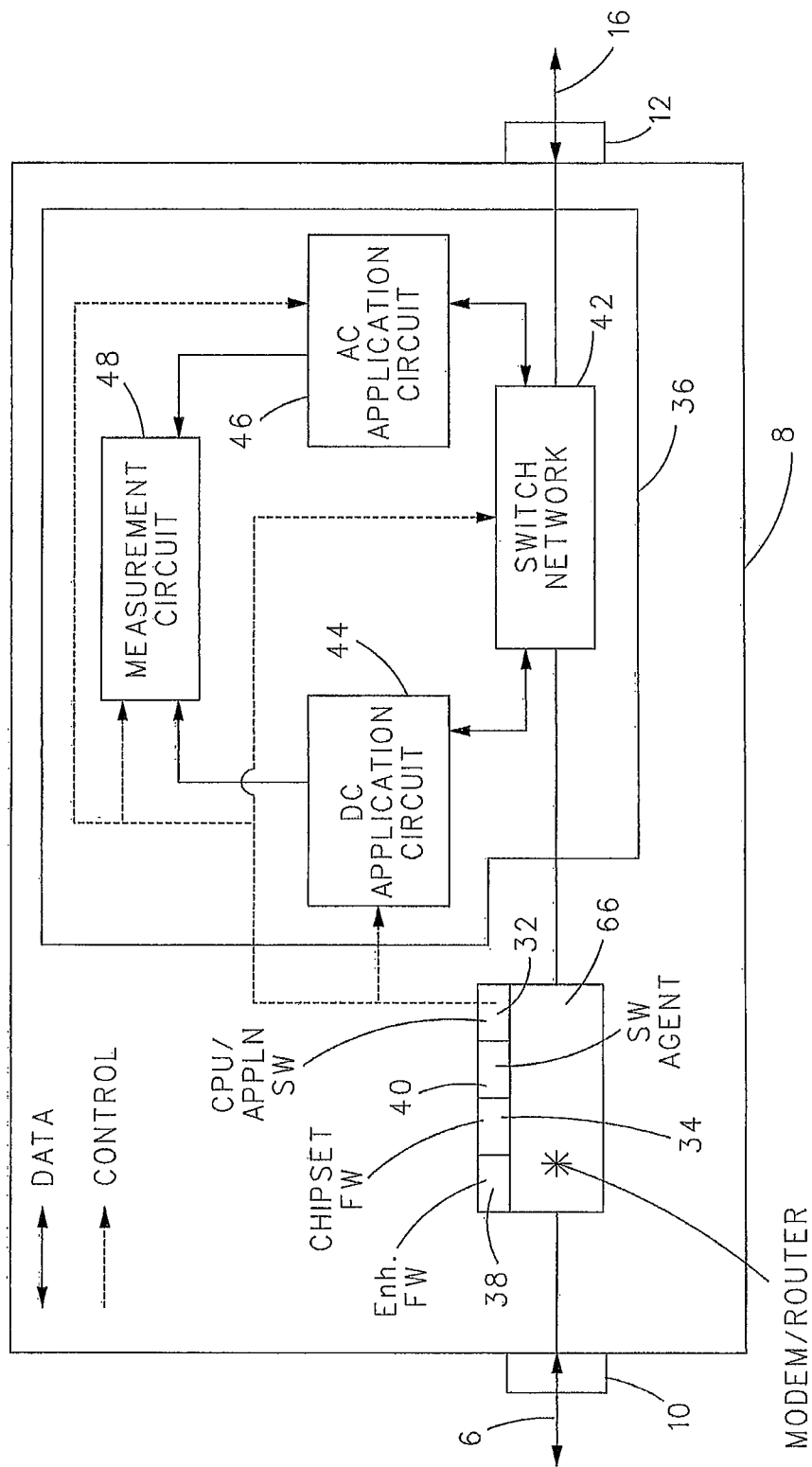
FIG. 6 is a block diagram of the internal components of the residential gateway of FIG. 1 including, in accordance with the present invention, an instance of the Measurement AFE/Pass-Through shown in FIG. 4 in operative relation to the modem/router functions of the residential gateway.

With reference to FIG. 6, in accordance with the present invention residential gateway 8 also includes the addition of an instance of a Measurement AFE/Pass-Through 36 positioned to apply DC and AC signals onto cable 16 and to measure the response of communication network 2 to said AC and DC signals. FIG. 6 also shows the internal modem/router 66 of residential gateway 8 along with the CPU/application software 32, the software agent 40, the chipset firmware 34, and the enhanced firmware 38 of Measurement AFE/Pass-Through 36 of residential gateway 8.

Having thus generally described the hardware, software, and firmware that the present invention adds to the conventional hardware and software of a prior art STB and residential gateway 8, the operation of the present invention will now be described with reference to the embodiment of communication network 2 shown in FIG. 1, wherein residential gateway 8 and each STB 14 is assumed to include a measurement AFE/Pass-Through 36. However, this is not to be construed as limiting the invention since it is envisioned that the present invention finds application in a communication network setting only includes a single STB 14 connected directly to residential gateway 8.

Generally, each instance of a Measurement AFE/Pass-Through 36 is coupled to the internal cables 16 and 24-1-24-3 of communication network 2. The operation of communication network 2 shown in FIG. 1, wherein instances of Measurement AFE/Pass-Through 36 are included in residential gateway 8 and each STB 14-1-14-3 in the manner shown in FIGS. 6 and 4 will now be described.

Figure 7:
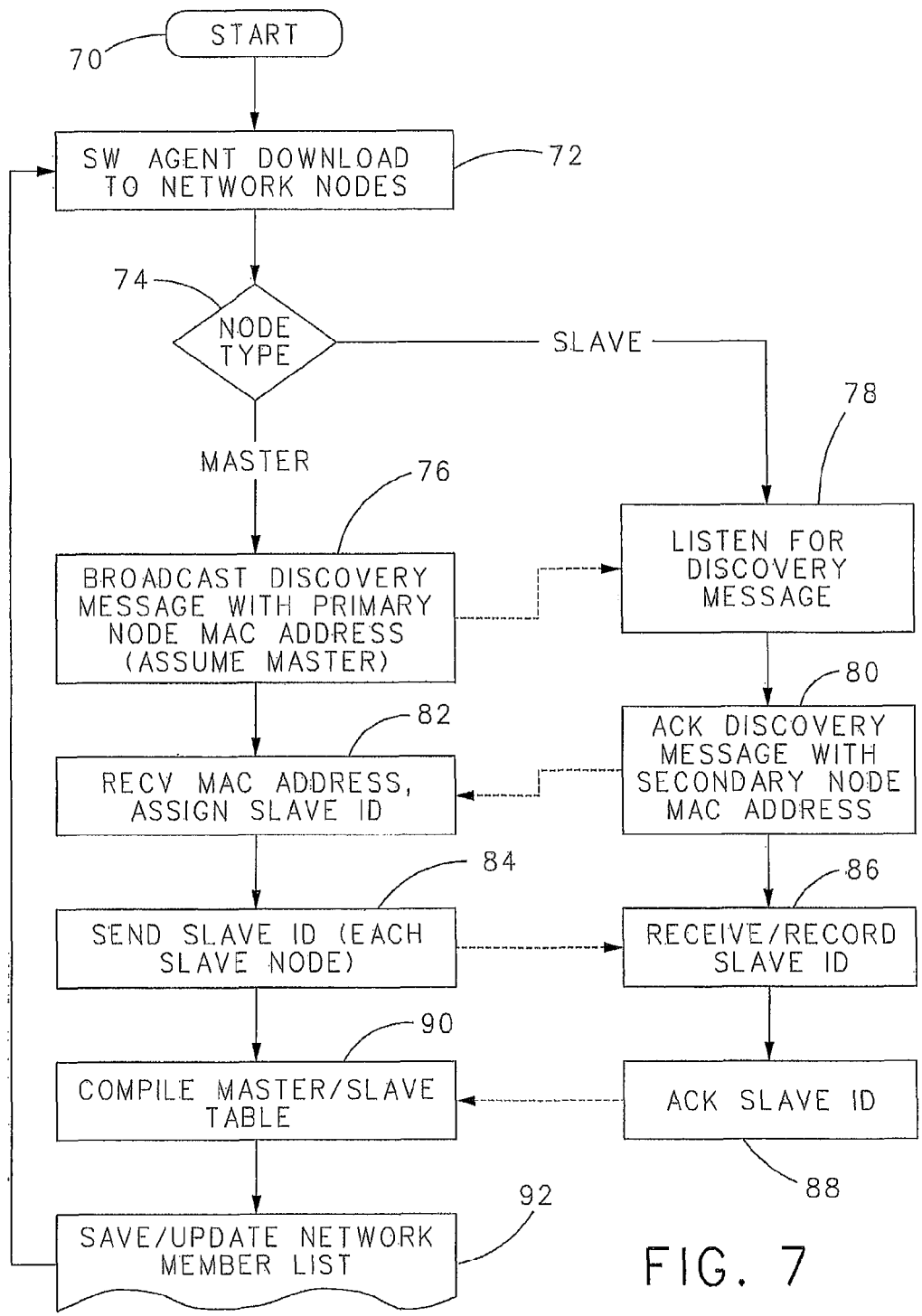
FIG. 7 is a flow diagram of an exemplary network discovery and initialization method that can be implemented by the residential gateway and STBs of FIG. 1.

With reference to the flow diagram of FIG. 7, in a method of network discovery and initialization, the method advances from a start step 70 to a step 72 wherein software agent 40 is downloaded to each network node, namely, residential gateway 8 and STBs 14-1-14-3. If, for any node, software agent 40 is pre-installed, step 72 can be bypassed for said node.

The method then advances to step 74 where a decision is made by each node whether it is a master node or a slave node. Desirably, the software agent 40 residing in residential gateway 8 works with the CPU 32/application software of residential gateway 8 to establish residential gateway 8 as the master node. Desirably, the software agent 40 downloaded into each STB 14-1-14-3 works with the CPU 32/application software thereof to establish said STB as a slave node in the network.

In residential gateway 8, software agent 40 causes the method to advance to step 76. In contrast, the software agent 40 residing in each STB 14-1-14-3 causes the method to advance to step 78. In step 76, the software agent 40 residing in residential gateway 8 broadcasts a discovery message with primary node MAC address. During network discovery and initialization, each STB 14-1-14-3, in step 78, listens for this discovery message output by residential gateway 8 in step 76 and, in step 80, acknowledges the discovery message with a secondary node MAC address. In step 82, residential gateway 8 receives the MAC addresses broadcast by STBs 14-1-14-3 and, in step 84 sends a slave unique ID to each STB 14-1-14-3 acting in its capacity as a slave node. In step 86, each STB 14-1-14-3 acting in its capacity as a slave node receives and records its slave unique ID and, in step 88 acknowledges its slave ID to residential gateway 8. In step 90, residential gateway 8 compiles a master/slave table and in step 92 saves and updates a network member list that residential gateway 8 utilizes thought to coordinate testing of communication network 2, including cables 16 and 24-1-24-3 in the manner described hereinafter.

It is envisioned that at a suitable time, the method of FIG. 7 can advance from step 92 back to step 72 wherein the network discovery and initialization process is repeated. This return to step 72 can be accomplished on demand or at regular or periodic intervals deemed suitable and/or desirable by one of ordinary skill in the art. However, it is to be appreciated that following step 92, the method of FIG. 7 can terminate. The decision to terminate the method of FIG. 7 or to return from step 92 to step 72 can be made by one of ordinary skill in the art based upon the configuration of the communications network 2 shown in FIG. 1 and whether or not said configuration is subject to change.

At a suitable time following the discovery and initialization of the nodes of the communication network 2 shown in FIG. 1, namely, residential gateway node 8, and STB nodes 14-1-14-3, the software agent 40 residing in residential gateway 8 can coordinate the testing of cables 16 and 24-1-24-3. Namely, the software agent 40 downloaded into residential gateway 8 will cause the following test to be performed on cables 16 and 24-1-24-3:
1. AC and DC metallic line test;
2. reflectometry (TDR and/or FDR) measurements; and
3. dual ended interactive tests between different nodes.

Each of these tests can provide distinct information about network cables 16 and 24 1-24-3 and junction 22 that can be utilized individually or in combination for diagnosis of faults and impairments in the network between residential gateway 8 and STBs 14-1-14-3. For example, under the control of the software agent 40 residing in residential gateway 8 acting in its capacity as a master node, said software agent 40 can cause the Measurement AFE/Pass-Through 36 of any one of residential gateway 8 or STBs 14-1-14-3 to perform an AC metallic line test, a DC metallic line test, or reflectometry (TDR and/or FDR) measurements of cables 16 and 24-1-24-3 and junction 22. More specifically, the software agent 40 residing in residential gateway 8 acting in its capacity as a master node can cause the Measurement AFE/Pass-Through 36 of residential gateway 8 to perform single-ended AC and/or DC metallic line tests and/or single-ended reflectometry measurements of the network comprising cable 16, junction 22 and cables 24-1-24-3. Similarly, the software agent 40 downloaded into residential gateway 8 acting in its capacity as a master node can cause the Measurement AFE/Pass-Through 36 of any one of STBs 14-1-14-3 to perform single-ended AC and/or DC metallic line tests and/or single-ended reflectometry measurements of the network comprising cables 24-1-24-3, junction 22, and cable 16.

The Measurement AFC/Pass-Through 36 of residential gateway 8 acting in its capacity as a master node facilitates single-ended line testing by the Measurement AFE/Pass-Through 36 of any one of STBs 14-1-14-3 by sending a suitable test command to said STB via cable 16, junction 22, and the cable 24 corresponding to the Measurement AFE/Pass-Through 36 of the STB 14 to perform said single-ended test. For example, if the Measurement AFE/Pass-Through 36 of STB 14-1 is to perform single-ended testing, the software agent 40 of residential gateway 8 acting in its capacity as a master node dispatches a suitable test command to the CPU 32 of STB 14-1 via cables 16 and 24-1, and junction 22. Operating under the control of the software agent 40 residing in STB 14-1, the CPU 32 of STB 14-1 causes Measurement AFC/Pass-Through 36 of STB 14-1 to perform single-ended testing of cables 16, 24-2, 24-3, and junction 22 via cable 24-1.

Similarly, under the control of software agent 40 residing in residential gateway 8, the CPU 32 of residential gateway 8 can initiate dual-ended interactive testing between any pair of nodes of communication network 2 shown in FIG. 1. In FIG. 1, these nodes include residential gateway 8 acting as a master node and each STB 14-1-14-3 acting as a slave node. Thus, for example, under the control of the software agent 40 residing in residential gateway 8, CPU 32 of residential gateway 8 can cause dual-ended interactive tests to be conducted between the Measurement AFE/Pass-Through 36 of residential gateway 8 and the measurement AFE or pass through of any one of STBs 14-1-14-3 under the control of the software agent 40 residing in said STB. Similarly, under the control of the software agent 40 residing in residential gateway 8, CPU 22 of residential gateway 8 can cause dual-ended interactive testing to occur between any 2 slave nodes of the communication network 2 shown in FIG. 1. For example, the software agent 40 residing in residential gateway 8 can cause dual-ended interactive testing to occur between STB 14-1 and STB 14-2; between STB 14-1 and STB 14-3; or between STB 14-2 and STB 14-3, all via junction 22.

Examples of conditions that can be acquired via the AC and DC metallic line tests include: longitudinal balance; insertion loss; insulation resistances; line impedance/reactance; line length; and line termination status. Examples of conditions that can be detected by a measurement circuit 48 of any one of the Measurement AFE/Pass-Through 36 residing in residential gateway 8 for one of the STBs 14-1-14-3 without the use of DC application circuit 44 or AC application circuit 46 include: ambient noise; foreign AC voltage; and foreign DC voltage.

Examples of time and frequency domain reflectometry (TDR and FDR) measurements that can be conducted of cable 16, junction 22, and cables 24-1-24-3 include: open; short; termination status; length; integrity of connections and splices (e.g., of junction 22); and insertion loss.

Examples of dual-ended measurements that can be made between any two nodes 8, 14-1, 14-2, and 14-3 of communication network 2 include: insertion loss; cable or segment length; noise and interference; and cable connectivity and integrity.

It is envisioned that some of the above-described measurements and acquired line conditions may be available for every architecture of communication network 2. Accordingly, the software agent 40 residing in each node is desirably configured to be flexible and adaptive to perform applicable measurements and corresponding analysis of line conditions. Based on whether the software agent resides in residential gateway 8, whereupon the software agent 40 causes residential gateway 8 to act in a capacity as a master node, or software agent 40 resides in one of the STBs 14, whereupon the software agent 40 causes said STB to act in a capacity of a slave node of the network.

Desirably, the line measurement sequences are interactive, i.e., subsequent measurement analysis depends on the results of a preceding test. An exemplary test sequence is shown in the flow chart of FIG. 8 wherein the method advances from start step 100 to step 102 wherein the software agent 40 residing in residential gateway 8 causes one of the instances of Measurement AFE/Pass-Through 36 of residential gateway 8, STB 14-1, STB 14-2, or STB 14-3 to perform a parametric line test to acquire one or more of the following line conditions: noise; longitudinal balance; insertion loss; insulation resistance; line impedance/reactance; foreign AC voltage; foreign DC voltage; line length; and/or line termination status.

Upon completion of said parametric line test and acquiring line conditions, the method advances to step 104 wherein a decision is made whether the parametric line test passed or failed. This decision can be made by the CPU 32 of any node 8, 14-1, 14-2, or 14-3 of communication network 2. However, such determination is communicated to CPU 32 of residential gateway 8 which acts on this determination and causes the method to advance the step 106 if a fault is detected or to advance to step 108 if a fault is not detected.

Assuming the method advances to step 106, the software agent 40 residing in residential gateway 8 causes CPU 32 of residential gateway 8 to initiate an FDR test by one of the nodes 8, 14-1, 14-2, 14-3 of communication network 2. Step 106 also compares actual FDR test results to a predetermined FDR footprint 110. From step 106, the method advances to step 112 where a determination is made by one of the nodes of communication network 2 whether a fault was located. Regardless of which node 8, 14-1, 14-2, or 14-3 makes this determination, CPU 32 of residential gateway 8 acts on this determination to advance to step 114 if a fault is detected or to advance to step 116 if a fault is not detected.

Returning now to step 104, if, in step 104, it is determined that the parametric line test in step 102 did not detect a fault, the method advances from step 104 to step 108, where under the control of the software agent 40 residing in residential gateway 8, a Measurement AFE/Pass-Through 36 of one of the nodes 8, 14-1, 14-1, 14-3 is cause to perform an FDR test and compare said FDR test to the predetermined FDR footprint 110. The difference between FDR test 106 and FDR test 108 is that FDR test 106 is designed for fault location analysis whereas FDR test 108 is designed for fault detection analysis.

The method then advances to step 118 where the results of the comparison of the FDR test and comparison performed in step 108 is acted upon by CPU 32 of residential gateway 8 operating under the control of software agent 40. If, in step 118, it is determined that a fault exists, the method advances to step 106 described above. However, if, in step 118, it is determined that a fault does not exist, the method advances to step 116.

In step 116, the software agent 40 residing in residential gateway 8 causes the Measurement AFE/Pass-Through 36 of residential gateway 38 to perform a double-ended measurement with the Measurement AFE/Pass-Through 36 of each STB 14-1-14-3, one at a time. Following step 116, the CPU 32 of residential gateway 8 operating under the control of the software agent 40 residing in residential gateway 8 advances to step 114 where the test results are output or dispatched by CPU 22 of residential gateway 8 operating under the control of the software agent 40 residing in residential gateway 8 in any suitable or desirable manner. For example, the test results can be dispatched back to broadband service provider 4, can be communicated to one or more STBs 14-1-14-3 for display on the corresponding television 18-1-18-3, respectively, or can be output on a port 68 of residential gateway 8 for dispatch to an intelligent control device connected to said port 68, such as a PC 69. The method then advances to stop step 116.

Figure 8:
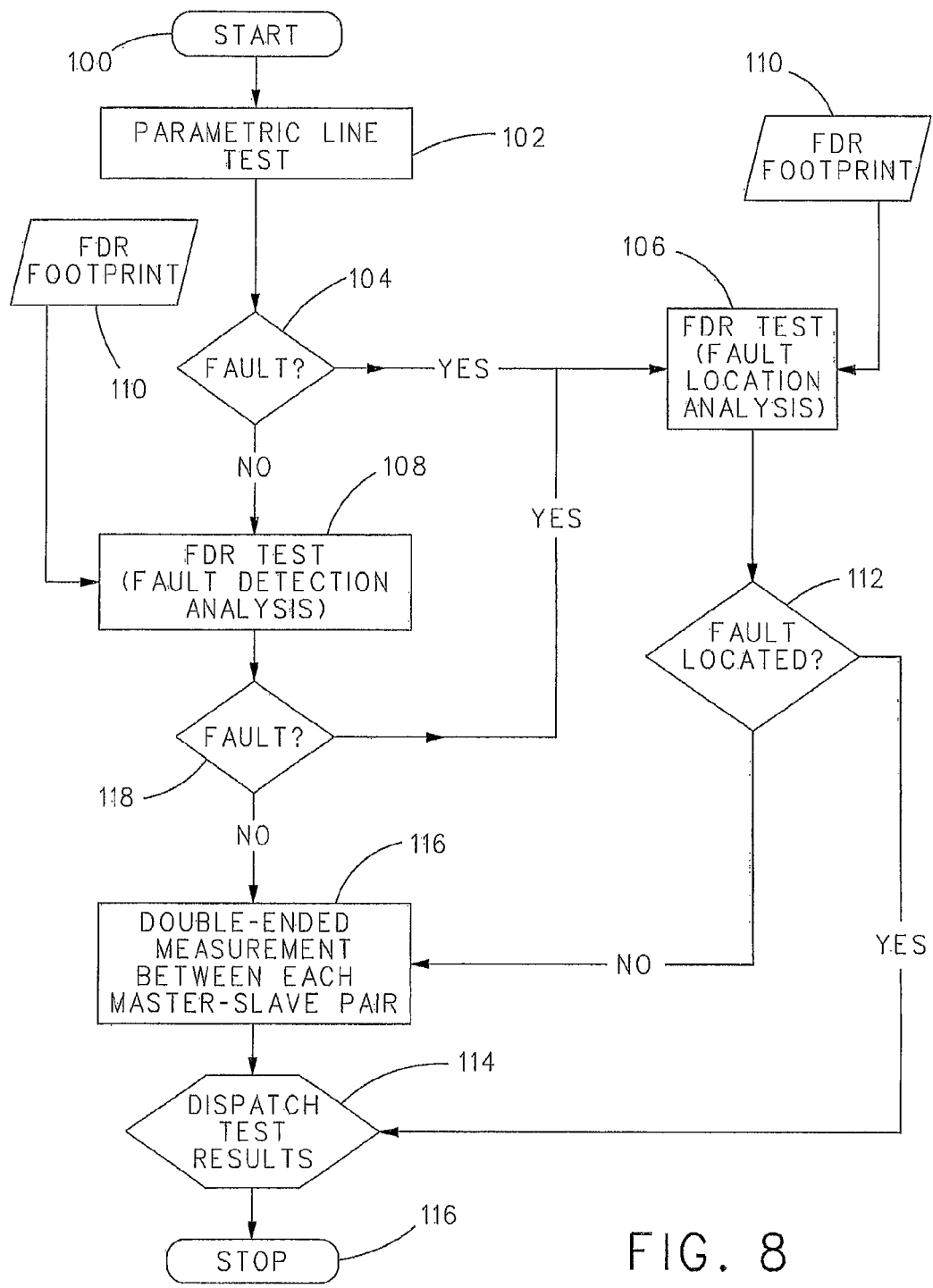
FIG. 8 is a flow diagram of an exemplary line test measurement sequence related to parametric fault analysis that can be implemented by the residential gateway and one or more STBs of FIG. 1.

The test sequence shown in FIG. 8 and described above is an exemplary test sequence and is not to be construed as limiting the invention.

A high level analysis of the method performed by residential gateway 8 modified to include the instance of the Measurement AFE/Pass-Through 36, software agent 40, and enhanced firmwear 38 shown in FIG. 6 and each STB 14-1-14-3 modified to include the Measurement AFE/Pass-Through 36, software agent 40, and enhanced firmwear 38 shown in FIGS. 3 and 4 will now be described with reference to the flow diagram of FIG. 9.

Figure 9:
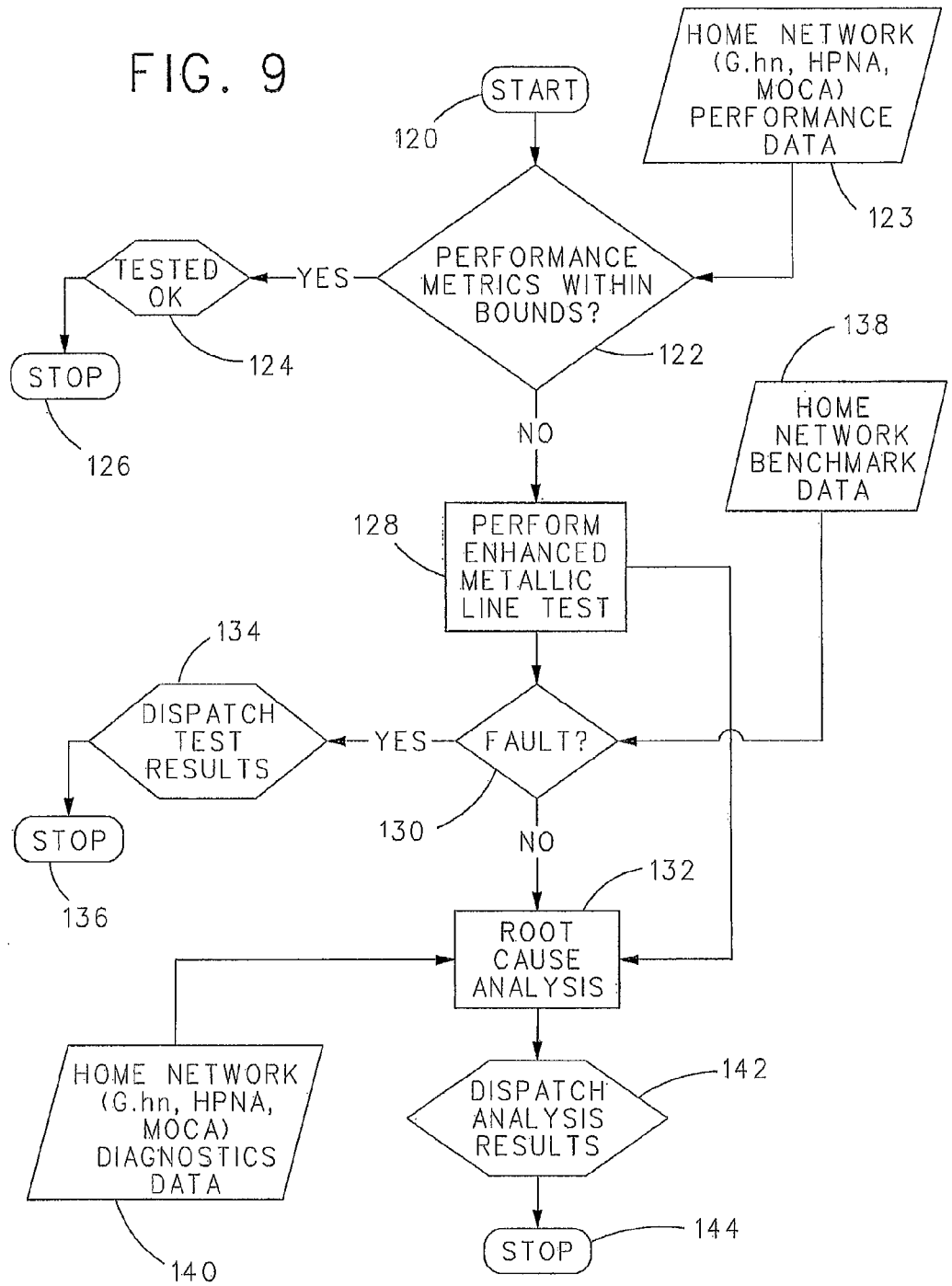
FIG. 9 is a flow diagram of an exemplary overall analysis method that can be implemented by the residential gateway and one or more STBs of FIG. 1.

In the flow diagram of FIG. 9, the method advances from start step 120 to step 122 wherein CPU 32 of residential gateway 8 operating under the control of SW agent 40 residing in residential gateway 8 determines whether the line conditions acquired by any one or a combination of the parametric line tests, the time and frequency domain reflectometry tests, and/or the dual-ended measurement tests are within predetermined bounds or tolerances 123 available to CPU 32 of residential gateway 8 in step 122. If so, the method advances to step 124 where the CPU 32 of residential gateway 8 deems the step to be successful whereupon the method advances to stop step 126. Optionally, if the CPU 32 of residential gateway 8 in step 124 deems the line test to be within acceptable tolerances, CPU 32 of residential gateway 8 can cause said test results to be displayed on one or more televisions 18-1-18-3, can cause test results to be supplied to broadband service provider 4, and/or can cause test results to be output on port 68 of residential gateway 8 for retrieval and/or analysis by a PC 69, or any other suitable and/or desirable type or form of intelligent controller.

Exemplary bounds or tolerances 123 available to CPU 32 of residential gateway 8 include packet errors; signal-to-noise ratio (SNR); and receive signal power. However, this list of bounds or tolerances is not to be construed as limiting the invention.

Returning to step 122, if it is determined by the CPU 32 of residential gateway 8 that one or more line measurements are not within acceptable tolerance, the method advances to step 128 where CPU 32 of residential gateway 8 operating under the control of software agent 40 residing in residential gateway 8 causes one or more enhanced metallic line tests to be performed by the Measurement AFE/Pass-Through 36 of one or more nodes 8, 14-1, 14-2, and/or 14-3 of communication network 2. The results of the enhanced performance metallic line test(s) of step 128 are provided in parallel to steps 130 and 132. In step 130, the CPU 32 of residential gateway 8 determines if the enhanced metallic line test detected a fault. If so, the method advances to step 134 where CPU 32 of residential gateway 8 dispatches test results to one or more televisions 18-1-18-3, to broadband service provider 4, and/or to port 68 for retrieval and analysis by an intelligent control device, such as PC 69. However, if in step 130, CPU 32 of residential gateway 8 determines that the enhanced metallic line test passed, the method advances to step 132. In 130, the CPU 32 of residential gateway 8 determines whether or not a fault is present by comparing the results of the enhanced metallic line test(s) to home network benchmark data 138 for said enhanced metallic line test(s).

In step 132, the CPU 32 of residential gateway 8 performs a root cause analysis by comparing the line tests to home network diagnostic data 140. In step 142, CPU 32 of residential gateway 8 dispatches the analysis results to one or more of televisions 18-1-18-3, to broadband service provider, and/or to port 68 for analysis and retrieval by an intelligent control device, such as a PC 69. The method then advances to stop step 144.

Figure 10:
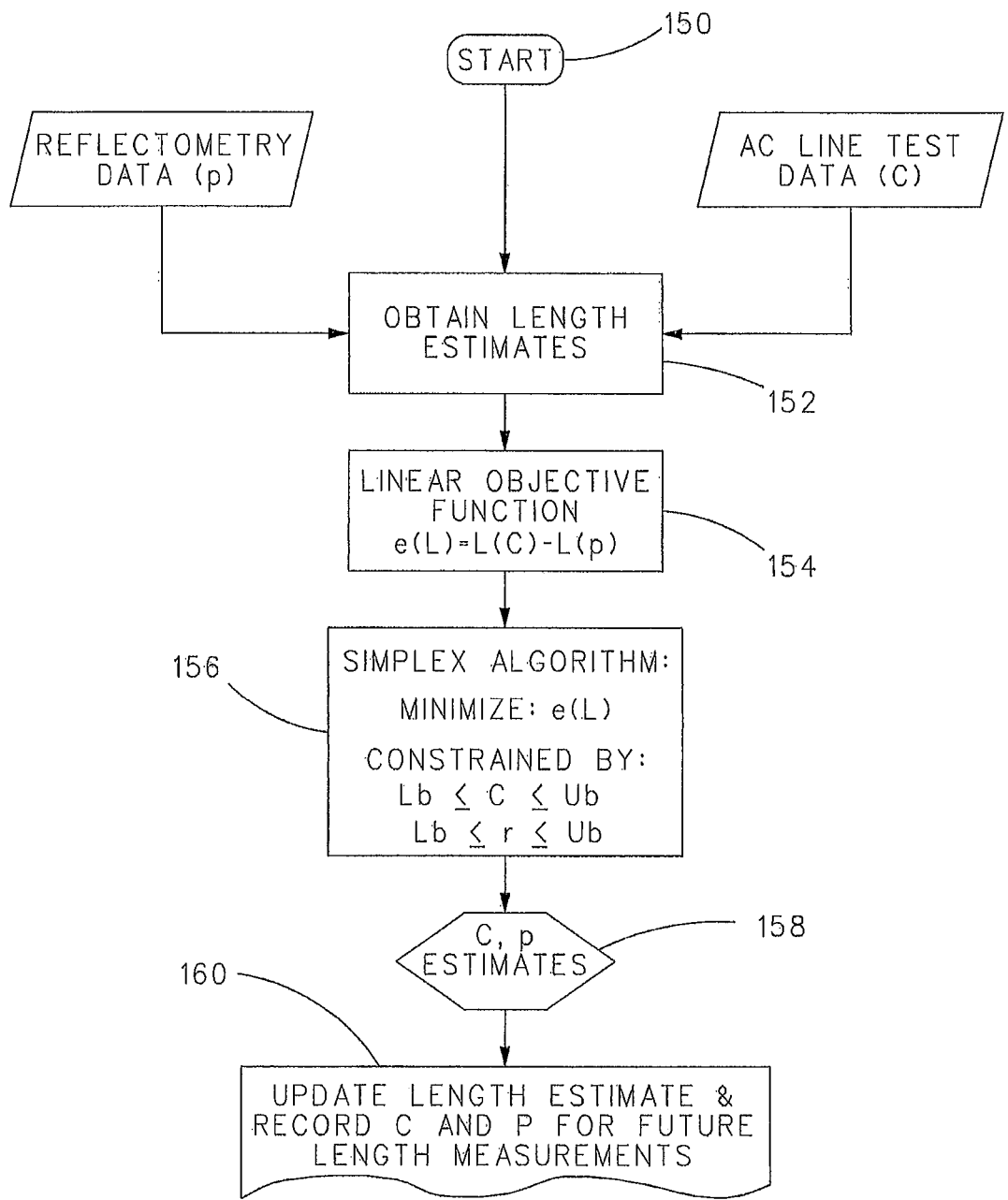
FIG. 10 is a flow diagram of an exemplary integrated analysis that can be implemented by the residential gateway and/or one or more STBs of FIG. 1.

With reference to the exemplary integrated analysis flow chart of FIG. 10, the method advances from a start step 150 to a step 152 wherein the CPU 32 of residential gateway 8 operating under the control of the software agent 40 residing in residential gateway 8 causes the Measurement AFE/Pass-Through 36 of one or more nodes 8, 14-1, 14-2, and/or 14-3 to obtain line length estimates from a number of different measurement techniques, e.g., a reflectometry measurement and a low frequency parametric line measurement. To this end, the software agent 40 residing in residential gateway 8 has knowledge of the propagation constant of the cable under test. Similarly, the cable length measurement obtained from low frequency line tests, such as capacitance, requires that software agent 40 residing on residential gateway 8 have knowledge of the line characteristics, such as capacitance per meter (or resistance per meter), for the measurement. When only one of the measurements is available, the estimate of line length is as accurate as the knowledge of the line characteristic parameter. However, the length measurement can be improved if both measurements are available using an approach that optimizes the estimate by minimizing the error in length obtained from the two test results.

In accordance with this example, the method advances to step 154 wherein an optimization problem, namely, a linear objective function, is solved for improving the length estimate obtained from AC line test data and from reflectometry data. For example, one possible linear objection and function, shown in step 154 of FIG. 10, is formulated as a linear equation with possible ranges for capacitance (or resistance) per meter and the propagation constant acting as a linear constraint to the optimization problem.

The method then advances to step 156 where the optimization problem is solved, e.g., utilizing the well-known Simplex Algorithm. The method then advances to step 158 where the solution of the length data C determined from the AC line test data and the length p determined by the reflectometry data are determined. In step 160, the values for C and p are updated in a memory of CPU 32 of residential gateway 8 and recorded for future length measurement.

The present invention also enables correlation of diagnostic data across different layers of the communication network 2 shown in FIG. 1. Typically, where measurement and diagnostic data from different sources, such as two or more of residential gateway 8, STB 14-1, STB 14-2, and STB 14-3, are available, there can be inter-relation between said data depending upon the type of impairment. Correlation of relevant data obtained from different sources is performed for root cause and dispatch analysis.

One possible integrated analysis is detection of degradation in the performance of cables 16, 24-1, 24-2, and/or 24-3. The following information can be utilized by CPU 32 of residential gateway 8 for identifying a root cause of this performance degradation in a link data rate and/or where high error rate is observed: longitudinal balance; signal to noise ratio (SNR); noise power; noise margin; and/or the error seconds (DSL MIB data). In the case where the analysis determines a low balance of cables 16, 24-1, 24-2, and/or 24-3 from physical line test data acquired from one or more of cables 16, 24-1, 24-2, and/or 24-3, test results indicative of this are output to one or more televisions 18-1-18-3, to broadband service provider 4, and/or to port 68 of residential gateway 8 for retrieval and analysis by an intelligent controller, such as PC 69. Similar comments apply is respect of CPU 32 of residential gateway 8 determining low longitudinal balance or that the physical wiring is "tested OK" with the degraded data rate.

Desirably, CPU 32 of one or more nodes 8, 14-1, 14-2, and/or 14-3 is operative under the control of its software agent 40 to perform an integrated analysis of test data or data sets obtained during the performance of any one or combination of the parametric line tests, reflectometry measurements and double-ended interactive tests discussed above to provide a combined data analysis statement for the identification of a root cause failure in any one or combination of tables 16, 24-1, 24-2, 24-3, and/or junction 22. More specifically, there are multiple sources of data available to the software agent 40 for diagnosis of communication network 2. For Example, from residential gateway 8 and one or more STBs 14-1-14-3, the following example classes of information can be acquired: equipment inventory and status, e.g., hardware make, model, and firmware version; link status and performance data, e.g., DSL MIB data; and network diagnostic statistics, e.g., bit error rates and noise specifics. The addition of the Measurement AFE/Pass-Through 36 and enhanced firmware 38 to the MoCA, HPNA, and/or G.hn chipsets provides additional measurement capabilities beyond standard specification requirement. These measurements provide tools for cost analysis, sectionalizton, and isolation of quality of service (QOS) and quality of experience (QOE) problems inside communication network 2 by providing specific function, such as, without limitation, DC (metallic) and AC (impedance) parametric line tests, e.g., leakage resistances; reflectometry (TDR and FDR) measurement, e.g., table length; and double-interactive tests, e.g., insertion loss.

The software agent 40 performs these functions either autonomously or on demand, aggregates this data and dispatches this data as required or at periodic intervals to an external application. This external application categorizes each data point and assigns a weighted value to its importance. Then, the application determines the fault identification, location, and resolution, desirably by way of an artificial intelligence algorithm. It is envisioned that can run any suitable and/or desirable suite or combination of tests and aggregate the data acquired in response to these tests either periodically or on demand to provide a comprehensive diagnosis of communication network 2, especially cables 16, 24-1-24-3 and junction 22.

Lastly, with reference to FIGS. 11A and 11B, exemplary test parameters for various test types described above are shown.

The invention has been described with reference to exemplary embodiments. Obvious modifications and alterations will occur to others upon reading and understanding the preceding detailed description. For example, it is envisioned in one alternate embodiment that gateway 8, STB 14-1, STB 14-2 and/or STB 14-3 (or any other device, such as, without limitation, a PC or a smart appliance that includes a MoCA, HPNA, or G.hn interface) can exclude Measurement AFE/Pass-Through 36 and enhanced firmware 38 while still enabling some limited testing, such as one or more of the single-ended tests described above, with use of the existing hardware of STB described generally in FIG. 2 above. It is intended that the invention be construed as including all such modifications and alterations insofar as they come within the scope of the appended claims or the equivalents thereof.

The invention claimed is:

1. In a first, residential broadband communication network comprised of a first node and a second node, wherein the first node includes circuitry for application of AC and DC test signals in a direction on the first network toward the second node and a measurement circuit for detecting for the presence of AC and DC signals on the first network, and the second node includes circuitry for application of AC and DC test signals in a direction on the first network toward the first node and a measurement circuit for detecting for the presence of AC and DC signals on the first network, a method of testing the first network comprising:
   (a) the first node or the second node performing one or more single-ended parametric tests of the first network that runs between the first node and the second node;
   (b) the first node or the second node performing one or more single-ended reflectometry tests of the first network that runs between the first node and the second node;
   (c) the first node and the second node performing one or more dual-ended tests of the first network that runs between the first node and the second node; and
   (d) the first node dispatching the results of the tests in steps (a)-(c) to either: a device on the first network, a device of a second network that supplies broadband services to the first network, or an intelligent device coupled to the first node.

2. The method of claim 1, wherein:
the first node is a residential gateway; and
the second node is a set top box, a PC, or a smart device that includes a MoCA, HPNA, G.hn, or equivalent interface.

3. The method of claim 1, wherein, in step (d), the results of the tests in steps (a)-(c) include the first node integrating data obtained or determined in response to the tests of steps (a)-(c) and analyzing the integrated data to determine one of the following: that the communication network can support a particular speed broadband service or a root cause of a failure in the communication network.

4. The method of claim 2, wherein the residential gateway is operative for performing the function of a modem and a router, wherein the modem function receives broadband services from the second network, and the router function supplies broadband services to the first network.

5. The method of claim 1, wherein:
the first node converts between DSL or cable service on the second network and Ethernet service on the first network, and vice versa.

6. The method of claim 1, wherein:
the second node is a set top box.

7. The method of claim 1, wherein the one or more single-ended reflectometry tests include: a single-ended time-domain reflectometry test; a single-ended frequency-domain reflectometry test; or both.

8. The method of claim 7, wherein the one or more single-ended reflectometry tests determine one or more of the following for a cable of the first network:
an open;
a short;
termination status;
length;
integrity of connectors and/or splices; and
insertion loss.

9. The method of claim 1, wherein the one or more single-ended parametric tests include:
an AC metallic line test;
a DC metallic line test; or
both.

10. The method of claim 9, wherein the one or more single-ended parametric tests determine one or more of the following:
Noise on the first network;
Longitudinal Balance of cabling of the first network;
Insertion Loss of the cabling the first network;
Insulation resistance of the cabling of the first network;
Line impedance/reactance of the cabling of the first network;
the presence of a foreign AC voltage on the cabling of the first network;
the presence of a foreign DC voltage on the cabling of the first network;
an estimate of a length of the cabling of the first network; and
a termination status of the cabling of the first network.

11. A broadband communication network comprising:
a residential gateway operative as a broadband interface between a broadband service provider and a broadband residential communication network, said residential gateway including first test hardware and a first CPU that operates under the control of a first software agent for controlling operation of the first test hardware to:
apply a first AC test signal, a first DC test signal, or both the first AC test signal and the first DC test signal to the broadband residential communication network, and
sample a first AC signal, a first DC signal, or both the first AC signal and the first DC signal on the broadband residential communication network; and at least one interface device (ID) operative as an interface between the broadband residential communication network and a data service receiving device, each of the at least one interface device including second test hardware and a second CPU that operates under the control of a second software agent for controlling operation of the second test hardware to:

apply a second AC test signal, a second DC test signal, or both the second AC test signal and the second DC test signal to the broadband residential communication network, and sample a second AC signal, a second DC signal, or both the second AC signal and the second DC signal on the broadband residential communication network, wherein at least one of the first AC test signal, the first DC test signal, the first AC signal, and the first DC signal comprise a dual-ended test of the broadband residential communication network with at least one of the second AC test signal, the second DC test signal, the second AC signal, and the second DC signal.

12. The broadband communication network of claim 11, wherein:

the first test hardware is operative for sampling a response of the residential communication network to a test signal applied by the first test hardware or the second test hardware; or the second test hardware is operative for sampling a response of the residential communication network to a test signal applied by the first test hardware or the second test hardware.

13. The broadband communication network of claim 11, wherein the first test hardware, the second test hardware, or both are operative for performing one or more of the following:

one or more single-ended parametric tests of the residential communication network; and one or more single-ended reflectometry tests of the residential communication network.

14. The broadband communication network of claim 11, wherein the first test hardware and the second test hardware are operative for performing one or more dual-ended tests of the residential communication network.

15. The broadband communication network of claim 11, wherein:

the at least one interface device comprises a plurality of interface devices, wherein the second test hardware of one of the plurality of interface devices is operative for performing one or more of the following:

one or more single-ended parametric tests of the residential communication network; and one or more single-ended reflectometry tests of the residential communication network.

16. The broadband communication network of claim 11, wherein:

the at least one interface device comprises a plurality of interface devices, wherein the second test hardware of one of the plurality of interface devices and the second test hardware of another one of the plurality of interface devices are operative for performing one or more dual-ended tests of the residential communication network.

17. The broadband communication network of claim 11, wherein the at least one interface device is a set top box.

18. The method of claim 11, wherein either the first or second CPU is operative for integrating data either obtained from the communication network, or determined in response to one or more single-ended tests, one or more dual-ended tests, or both of the communication network, and for analyzing the integrated data to determine one of the following:

that the communication network can support a broadband services of a particular speed, or a root cause of a failure in the communication network.

19. The broadband communication network of claim 18, wherein coaxial cable or a wire pair or a twisted wire pair connects the residential gateway and the at least one interface device.

20. The broadband communication network of claim 11, wherein the residential gateway comprises a modem function coupled to the broadband service provider and a router function coupled to the communication network.

21. A method of testing a residential broadband communication network, the method comprising:

(a) outputting, from a first node of the residential broadband communication network that receives broadband services from a broadband service provider, a DC single-ended test signal, an AC single-ended test signal, or both the DC single-ended test signal and the AC single-ended test signal onto said residential broadband communication network;

(b) determining, at the first node and in response to the DC single-ended test signal and/or the AC single-ended test signal output in step (a), an electrical condition of the residential broadband communication network; and (c) co-acting, by the first node and a second node of the residential broadband communication network, to perform dual-ended testing of the residential broadband communication network.

22. The method of claim 21, wherein step (b) includes determining one of the following conditions of cabling of the broadband communication network:

longitudinal balance;
insertion loss;
insulation resistance;
line impedance/reactance;
the presence of a foreign AC voltage;
the presence of a foreign DC voltage;
length;
termination status;
an open;
a short; and
an integrity of connectors and/or splices of the cabling.

23. The method of claim 21, wherein step (c) includes determining one of the following conditions of cabling of the broadband communication network:

insertion loss;
length;
noise and interference; and
cabling connectivity and integrity.

24. The method of claim 21, wherein step (b) further includes the first node integrating single-ended test data, dual-ended test data, or both and analyzing the integrated data to determine one of the following:

that the communication network can support a particular speed broadband service or a root cause of a failure in the communication network.

25. The method of claim 21, wherein:

the second node is a set top box.

* * * * *